(12) United States Patent
Keith (10) Patent No.: US 6,193,048 B1
(45) Date of Patent: Feb. 27, 2001

(54) PALLET CHANGER

(75) Inventor: Malcolm E. Keith, Algonquin, IL (US)

(73) Assignee: Midaco Corporation, Elk Grove Village, IL (US)

( * ) Notice: Subject to any disclaimer, the term of this patent is extended or adjusted under 35 U.S.C. 154(b) by 0 days.

(21) Appl. No.: 09/198,279

(22) Filed: Nov. 24, 1998

(51) Int. Cl.[7] .................................................... B65G 37/00
(52) U.S. Cl. ..................... 198/346.1; 29/33 P; 198/465.1
(58) Field of Search ............................. 198/346.1, 346.2, 198/341.05, 341.03, 465.1; 29/33 P (56) References Cited

U.S. PATENT DOCUMENTS

| | | | |
|---|---|---|---|
| 4,747,193 | * 5/1988 | Hashidate et al. | 198/346.1 |
| 4,970,765 | * 11/1990 | Sakawa et al. | 198/346.1 |
| 4,996,754 | * 3/1991 | Kitamura | 198/346.1 |
| 5,044,486 | * 9/1991 | Kitamura | 198/346.1 |
| 5,259,494 | * 11/1993 | Hirose | 198/346.1 |
| 5,346,051 | 9/1994 | Keith . | |
| 5,370,212 | * 12/1994 | Mizutani et al. | 198/346.1 |
| 5,429,461 | * 7/1995 | Mukherjee et al. . | |
| 5,492,214 | 2/1996 | Keith . | |
| 5,813,514 | 9/1998 | Keith . | |
| 5,826,692 | * 10/1998 | Blanc | 198/346.1 |

FOREIGN PATENT DOCUMENTS

| | | | |
|---|---|---|---|
| 3111706 | * 1/1982 | (DE) | 198/346.1 |
| 404063658 | * 2/1992 | (JP) | 198/346.1 |

OTHER PUBLICATIONS

Midaco Corporation—Automatic Pallet Systems—Series 20A–30A–40A.
Midaco Corporation—Automatic Pallet Systems—Series 30A–40A.

* cited by examiner

*Primary Examiner*—Robert P. Olszewski
*Assistant Examiner*—Steven B. McAllister
(74) *Attorney, Agent, or Firm*—Patents+TMS

(57) ABSTRACT

An automatic pallet changer system in an automatic machining center has a first track for receiving a first pallet having a first workpiece thereon, and a second track for receiving a second pallet having a second workpiece thereon. The first and second tracks are side-by-side and extend from a region outside the enclosure to a region inside the enclosure adjacent the receiver. A linear drive unit is arranged between the first and second tracks and has a carriage which moves along a longitudinally extending carriage guide. The carriage has a member for engaging with the first or second pallet depending upon whether the linear drive unit is rocked to the left or to the right. A motor is connected to the linear drive unit for causing a movement of the carriage along the carriage guide. A rocker unit is connected to the linear drive unit for rocking the linear carriage unit to the left or to the right. A programmable logic control automatically controls overall operation of the system including the linear drive unit and detecting positions of the first or second pallet either within the machining enclosure or at the end of the linear drive unit adjacent the rocker unit.

26 Claims, 6 Drawing Sheets

PALLET CHANGER

BACKGROUND OF THE INVENTION

Automatic machining centers are previously known which employ a bed which is movable in a horizontal plane in two dimensions. It is also previously known to employ an automatic pallet changer employing a receiver positioned on the bed and having a draw plate for up and down motion of a pallet resting on the draw plate. Such a receiver is disclosed in U.S. Pat. No. 5,492,214. Parts being machined in the automatic machining center are fixed to the pallet by an operator.

Such machining centers have a vertically sliding door for closing off an entrance into the machining center enclosure. At the beginning or end of the machining, the pallet is either moved into or out of the machining enclosure by the automatic pallet changer. When the pallet is outside the enclosure, then it is accessible for a worker to either remove or mount the workpiece being machined.

It has been previously known in U.S. Pat. No. 5,3436,051 to provide a manual pallet change system.

It has been previously disclosed in U.S. application Ser. No. 575,138, entitled "Automatic End Loading Pallet System filed Dec. 19, 1995 recently issued into U.S. Pat. No. 5,813,514, and incorporated by reference herein, to automatically move first and second pallets into or out of the machining enclosure of the machining center. There, first and second pallets are employed so that the worker can be working on one of the pallets while it is outside the machining center while the other pallet is inside the machining enclosure. The pallets can then be automatically exchanged.

Finally, in another type of known automatic pallet system, an automatic pallet changer is provided where first and second tracks are provided side-by-side, with each track having a respective pallet associated with it. A bicycle chain-like horizontal loop is provided between the two tracks. A single dog is provided on the bicycle chain for ultimately engaging with the two pallets. Thus, one pallet is pulled out of the machine center enclosure and thereafter the second pallet is brought into the enclosure as the chain continues rotation.

Disadvantages of the previous systems, and particularly the system disclosed in the '851 patent, are: 1) cost of manufacture is high; 2) the design presents some reliability drawbacks; and 3) the actual pallet change time is excessive.

SUMMARY OF THE INVENTION

It is an object of the present invention to 1) lower the cost of manufacture; 2) improve the reliability of the product; and 3) to improve it s performance through improved cycle times.

According to the invention, an automatic pallet changer system is provided for an automatic machining center, the automatic machining center having an enclosure with an automated machine tool therein and a receiver on a bed moveable in two dimensions horizontally for carrying the pallet with the workpiece thereon which is being machined. A first track is provided for receiving a first pallet having a first workpiece thereon and a second track is provided for receiving a second pallet having a second workpiece thereon. The first and second tracks are arranged side-by-side. The tracks extend from a region outwardly of the enclosure to a region inside the enclosure adjacent the receiver. A linear drive unit is arranged between the first and second tracks and has a carriage which moves along a longitudinally extending carriage guide. The carriage has a member for engaging with the first or second pallet, depending upon whether the linear drive unit is rocked to the right or to the left. A motor is connected to the linear drive unit for causing a movement of the carriage along the carriage guide. A rocker unit is connected to the linear drive unit for rocking the linear carriage unit to the left or to the right.

BRIEF DESCRIPTION OF THE DRAWINGS

FIGS. 5A, B, C are diagrams for explaining the electrical control systems of the pallet changer of the present invention.

DESCRIPTION OF THE PREFERRED EMBODIMENTS

The machining center 11 has a machining enclosure 12 having an entrance opening 13 with a vertically sliding door 4 movable by a pneumatic cylinder 9 between an up and down position as shown by arrow 14A for either opening or closing off the opening 13 through which a first work pallet 14 and a second work pallet 15 can be moved.

The second pallet 15 carries a workpiece 17 typically being mounted onto the pallet 15 or removed from the pallet 15 by an operator externally of the machining center enclosure. While the worker is either fixing or removing a workpiece 17 from the second pallet 15, the first pallet 14 carrying a workpiece 16 is being automatically machined within the machining center enclosure 12 having an access door opening 12'. As is well known, in such a machining center 12, a spindle 18 carrying a tool 19A is automatically working on the workpiece 16, such as by use of an automatic numerical control computer.

Figure 3:
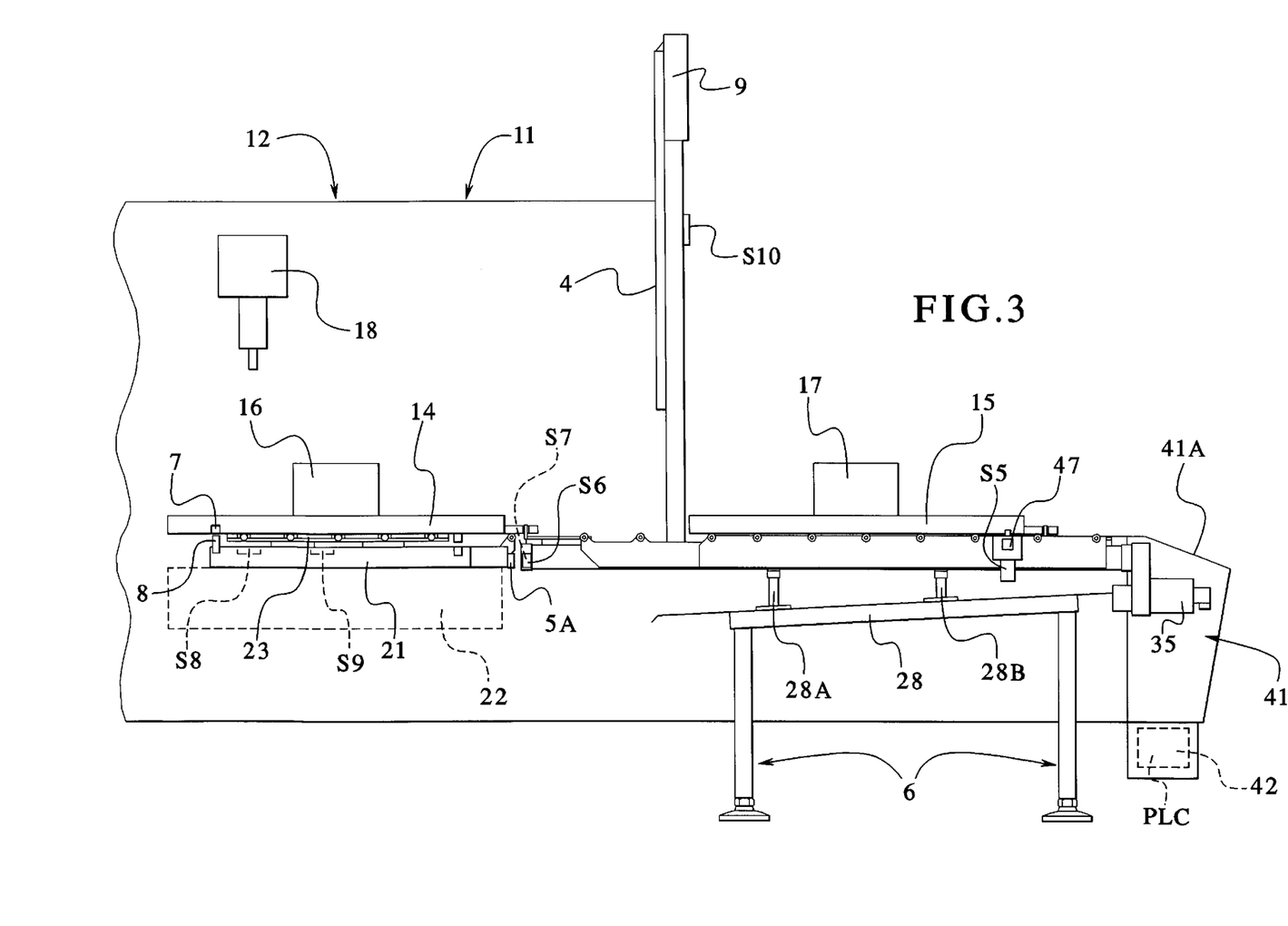
FIG. 3 is a side view of the pallet changer structure according to the present invention.

For two dimensional horizontal movement shown at 22A of the first pallet 14 and workpiece 16, as is schematically illustrated, a machine bed 22 carrying a receiver 21 having a draw plate 23 (see FIG. 3) is provided in the working enclosure 12. The receiver 21, as shown in FIG. 3 on the machine bed 22, carries the vertically moveable up-down draw plate 23 to which the first pallet 14 is held by a lip on the draw plate engaging in sliding fashion with a shoulder on the underside of the pallet not shown in detail. A locator pin 8 engages in a hole 7 of the pallet 14. In the down position of the draw plate 23, the locator pin 8 of the receiver engages in hole 7 of the pallet.

The machining center 11 used in conjunction with the improved pallet changer system of the invention typically has a parent machine control cabinet 24.

Figure 2:
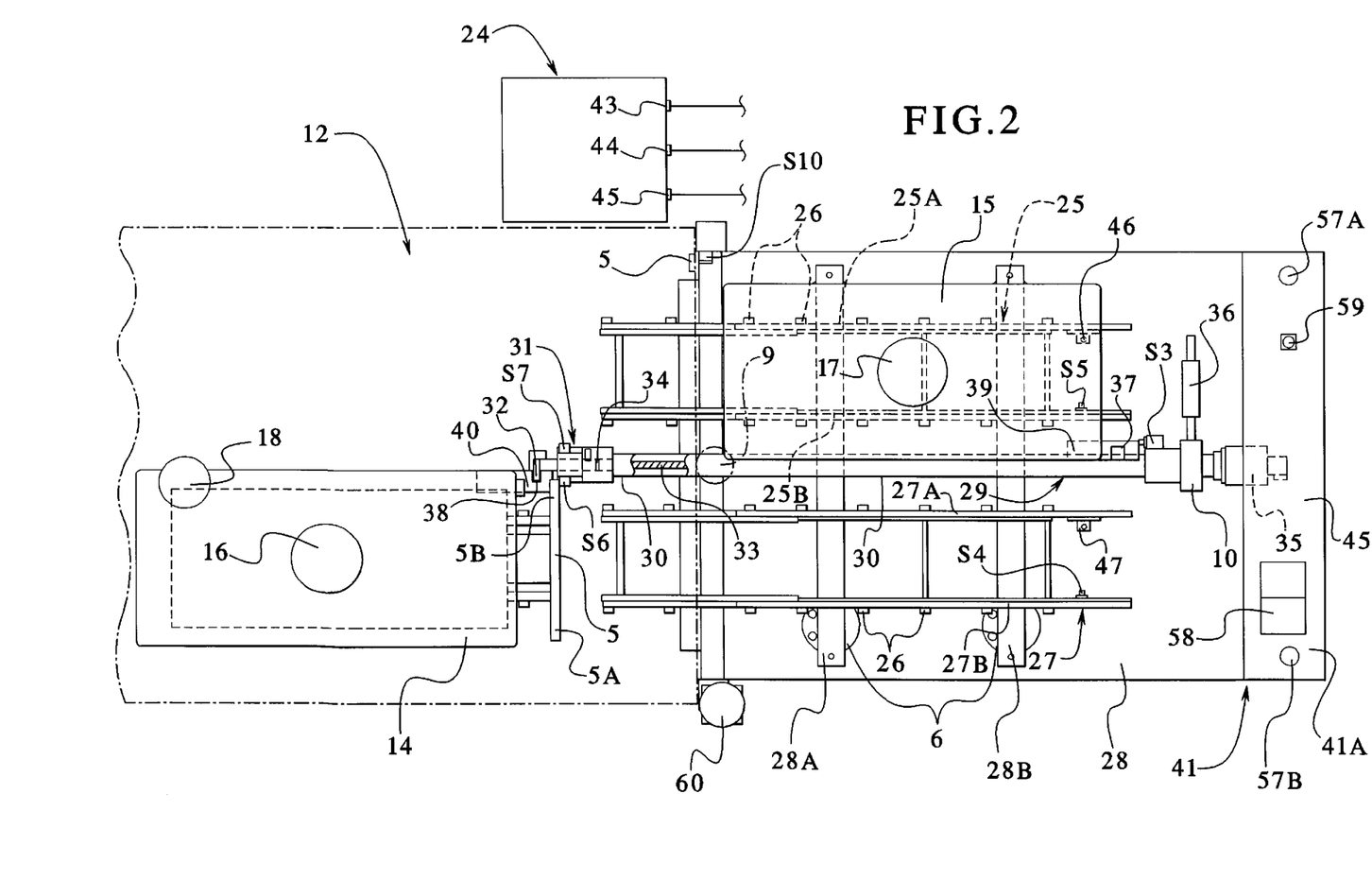
FIG. 2 is a top view of the machining center with the improved pallet changer according to the present invention and also showing the parent machine control center rack.

As shown in FIG. 2, in the improved pallet changer of the invention, the second pallet 15 rides on a second track 25 formed of first and second roller supports 25A and 25B each having a plurality of rollers 26 thereon. Similarly, a first track 27 is provided having first and second roller supports 27A and 27B also having a plurality of rollers 26. These first and second tracks are each mounted to a support base plate 28 by cross-members 28A and 28B. Support feet 6 support the plate 28.

Figure 4:
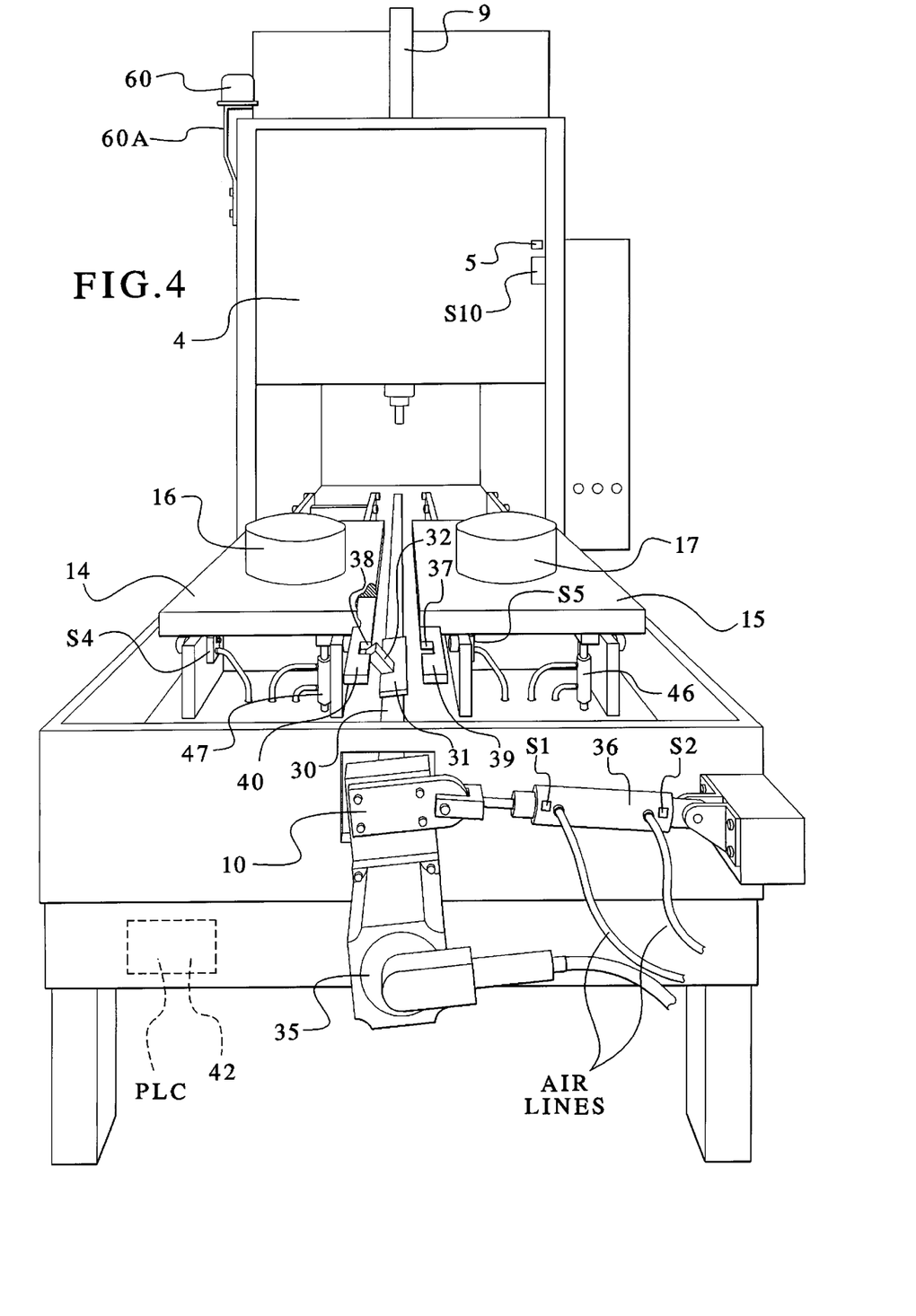
FIG. 4 is a perspective partial view from the end and the top of the improved pallet changer system of the present invention.

Between the first and second tracks, a linear drive unit 29 is arranged formed of a longitudinally extending carriage guide 30 along which rides a carriage 31 having an upwardly extending pawl 32 most clearly shown in FIGS. 2 and 4.

The linear drive unit 29 has an internal threaded drive screw 33 linked by a threaded member 34 to the carriage 31 for movement of the carriage along the carriage guide 30.

The drive screw 33 connects to a servo motor 35 via gear box 10 which can drive the drive screw 33 in either the forward or reverse direction.

Figure 1:
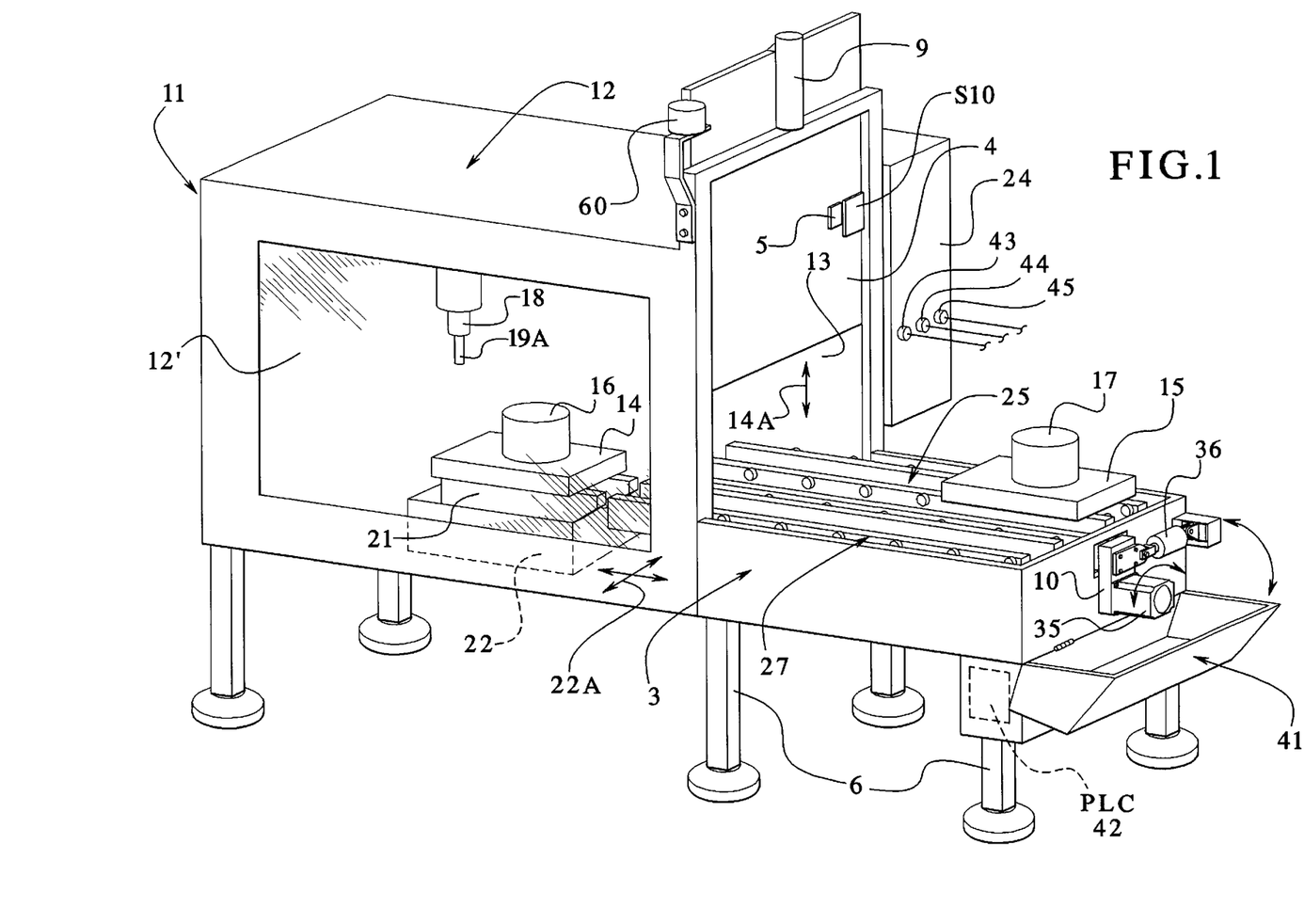
FIG. 1 is a perspective view of the improved pallet changer system used in conjunction with a machining center according to the invention.

The linear drive unit 29 is rocked to the left or to the right by a pneumatic piston 36 as shown most clearly in the perspective views of FIG. 1 and FIG. 4. As the linear drive unit is rocked, the pawl 32 on the carriage 31 engages as shown in FIG. 4 in either a notch 37 or a notch 38 in a drive plate 39 or 40, respectively shown most clearly in the perspective end view of FIG. 4, or in the top view of FIG. 2.

The servo motor 35 and rocker piston 36 are both provided inside an enclosure 41 having a control panel 41A. The control panel contains switches and lights as described hereafter in conjunction with FIG. 2 and FIGS. 5A, B, C.

Figures 5A, 5B:
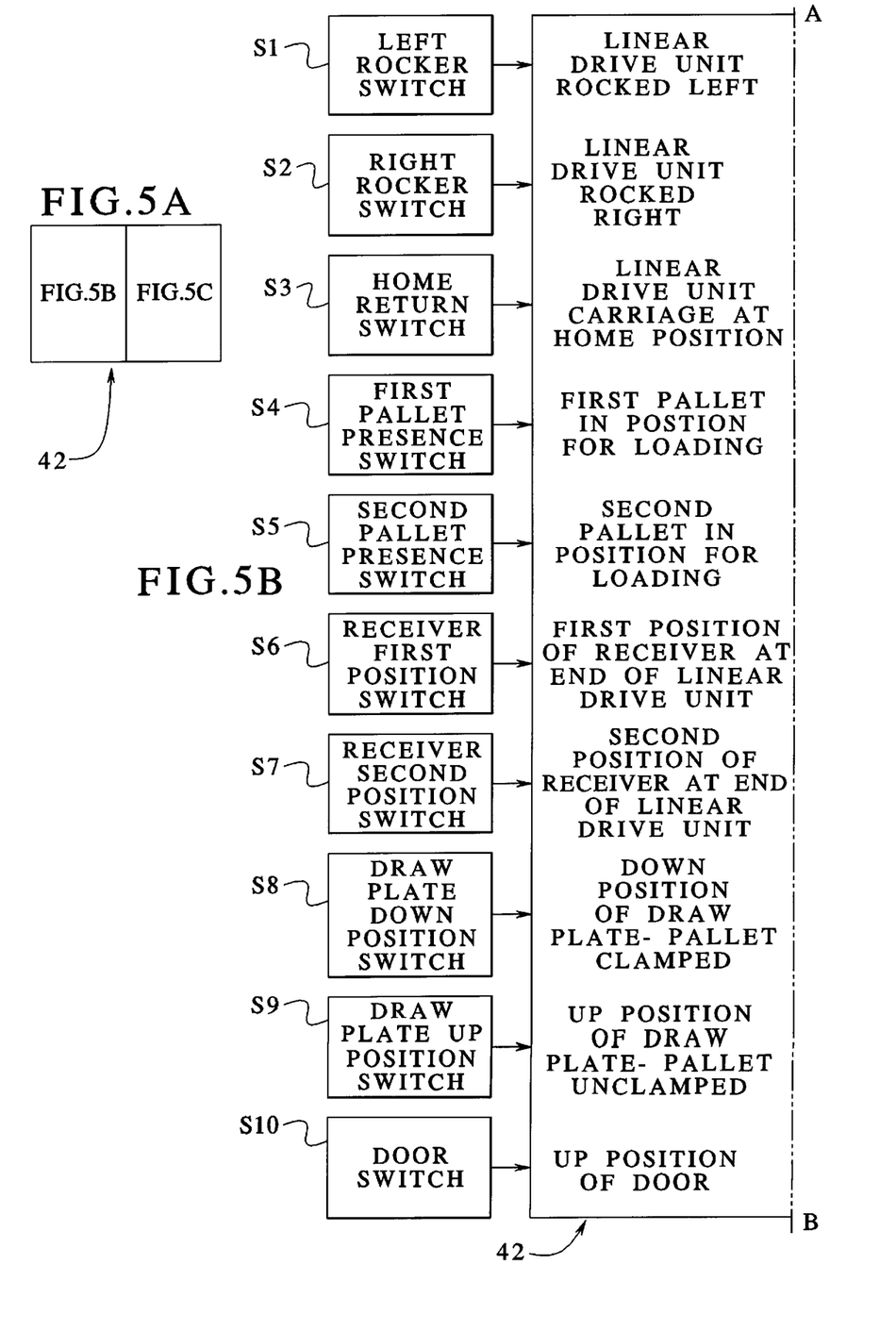
Figure 5C:
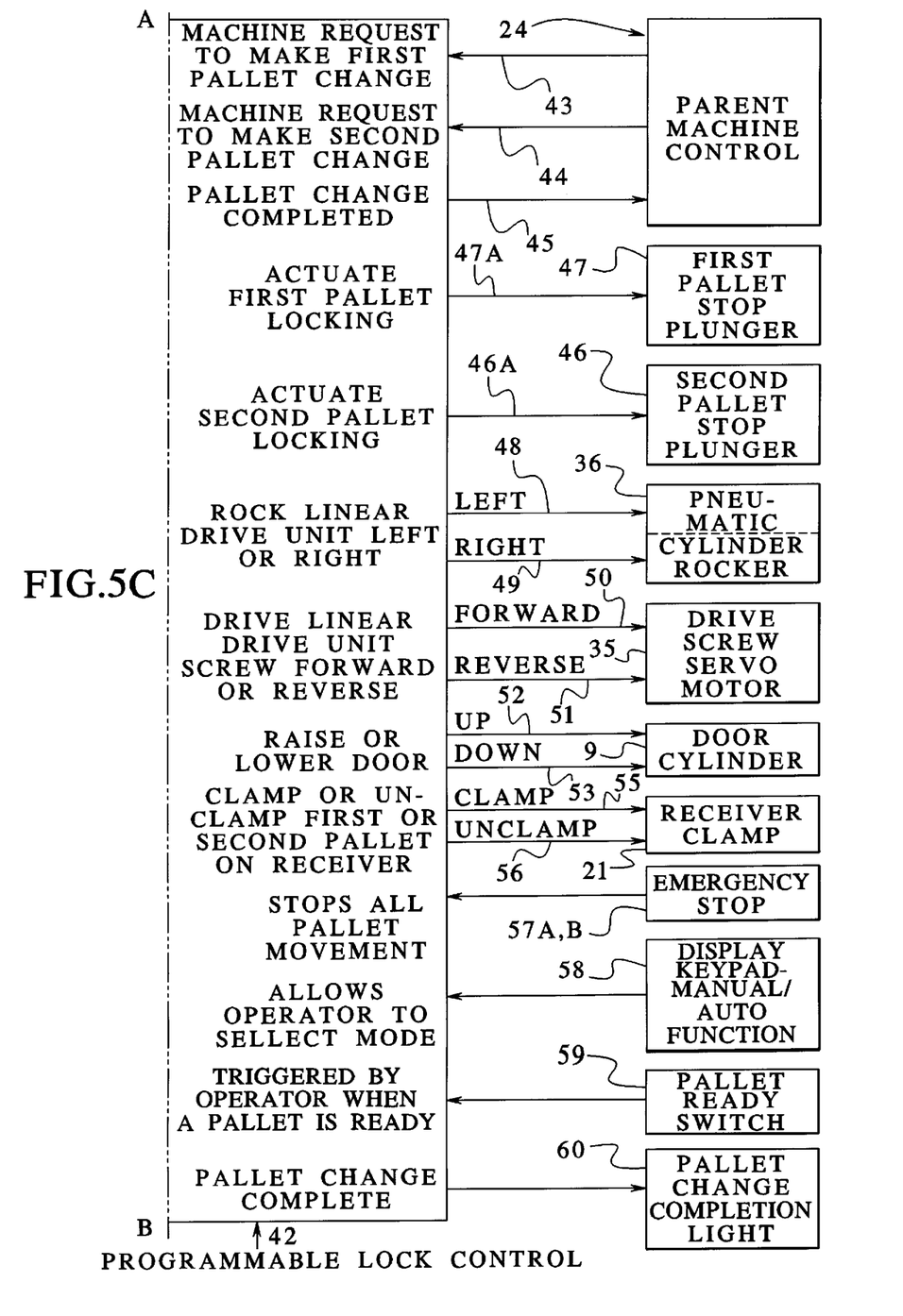

The overall control system for the improved pallet changer of the invention can be understood by referring to FIGS. 3A, B, C which shows a programmable logic control 42 connecting to various switches, lights, and control lines as discussed hereafter. Although signals are sent to solenoids for activating pneumatic units 47, 46, 36, 9, and 21, as shown in FIG. 5C, for simplicity the signals are shown as driving the units directly in FIG. 5C.

The programmable logic control 42 can be any commonly available unit from any of a variety of manufacturers. It is programmed to perform the following logic functions discussed with reference to FIGS. 5A, B, C.

Referring first to the left side of the programmable logic control 42 shown in FIG. 5B, a left rocker switch S1 and a right rocker switch S2 located at ends of the rocker cylinder 36 shown in FIG. 4 detect whether the rocker piston has rocked the linear actuator to the left most position or to the right most position. A home return switch S3 (FIG. 2) detects when the linear drive unit carriage 31 is in its home position at the initiation of operation, such as in the morning when the machine is first turned on.

First and second pallet presence switches S4 and S5 detect whether or not the respective first pallet or second pallet 14 or 15 are present or absent at the pallet loading stations outside the enclosure 12. The receiver first position switch S6 and the receiver second position switch S7 detect by contact with respective table position switch bar 5 ends 5A or 5B whether or not the receiver 21 carrying either the first pallet or the second pallet is in line either with the first track 27 or the second track 25 within the machining center 11 enclosure 12.

A draw plate down position switch S8 (see FIG. 3) determines whether the draw plate 23 is in the down position with the pallet 14 clamped. A draw plate up position switch S9 determines whether the draw plate 23 is in the up position with the pallet 14 unclamped.

Switch S10 (FIG. 1) is a door switch which detects via a projection 5 on the door 14 the up position of the door 14.

Referring to the right side of the programmable logic control 42 in FIG. 5C, a first output 43 connected from the parent machine control 24 to the programmable logic control (PLC) 42 is a parent machine request signal indicating that the parent machine is ready to make a pallet change to the first pallet 14 on the first pallet track 27. The output signal line 44 similarly indicates that the parent machine is ready to make a pallet change for the second pallet at the second pallet track 27. Output signal line 45 from the programmable logic control to the parent machine control is a signal indicating that a pallet change has been completed.

A first pallet stop plunger 47 and a second pallet stop plunger 46 are positioned for engagement with the first pallet 14 or the second pallet 15 when they are in their respective loading and unloading positions outside of the machining center enclosure for locking them in position. They are a pneumatic device having a reciprocating rod. A signal 47A and a signal 46A from the PLC actuates the respective pneumatic plungers 47 and 46 so that reciprocating rods thereof are received into a corresponding aperture in the respective first or second pallet.

For actuating the pneumatic cylinder rocker 36, a left moving control signal 48 or a right moving control signal 49 is output from the programmable logic control. Similarly, for actuating the servo motor drive screw 33 in the forward direction or reverse direction, a forward signal 50 or a reverse signal 51 is output from the programmable logic control to the drive screw servo motor 35.

For raising or lowering the door 4 via the pneumatic cylinder 9 (FIG. 4), an up signal 52 or a down signal 53 is sent from the programmable logic control to the cylinder 9.

For clamping the receiver 21 in the clamped position or in the unclamped position respective signals 55 or 56 are output from the programmable logic control.

Emergency stop buttons 57A, 57B are provided on the control panel 41 (FIG. 2) and which send a signal to the programmable logic control 42 to stop all pallet movement at any point in the operation.

As shown in FIG. 2, a manual/auto function on display keypad 58 on the control panel 41 allows the operator to select a manual mode for manually pushing the pallets along the tracks or for engaging the auto mode for performing the automatic operation to be described hereafter.

A pallet ready switch 59 is also mounted on the control panel 41 which is activated by the operator when the first pallet or the second pallet is ready for loading into the machine enclosure.

On a pole 60A is a pallet change completion light 60 which flashes and/or rotates. This light 60 is activated at the completion of a pallet change by the PLC.

Operation

According to the present invention, let us assume at the starting point that an operator is loading a workpiece 17 for the machine onto the second pallet 15 with the first pallet 14 sitting inside the machine enclosure as shown in FIG. 1. As workpiece 16 is being machined, the operator is changing workpiece 17 on pallet 15 outside of the machining center. When the operator has finished, he activates the ready switch 59 and may then leave the machine to attend to other duties. Then when the parent machine finishes machining part 16 and requests a pallet change via signal line 43, the door opens, the pawl engages the first pallet 14, the receiver unclamps, and the pawl retracts the first pallet out of the machine enclosure into a position where the lock pin of the plunger 47 engages in a hole of the first pallet 14. Now, automatically the PLC 42 sends a pallet change completed signal 45 back to the parent machine control. The parent machine control then moves the receiver with the machine bed to a position in front of the second pallet 15 on the second track 25. Now, the parent machine automatically sends on signal line 44 the request to make the second pallet change. At this point, the pallet positions appear as illustrated in FIG. 4.

Now, the PLC automatically begins the loading sequence for the second pallet 15 whereby the pawl 32 is rocked to the right to engage the second pallet 15, the lock pin 46 retracts, and the driver servo 33 drives the pallet 15 into the machine enclosure and onto the receiver. Then the PLC automatically sends the signal 55 to clamp the second pallet on the receiver. The pawl will then rock out of engagement with the second pallet 15 and retract slightly. The door 4 will then close, and the pallet change completed signal 45 will then be sent back to the parent machine allowing it to begin machining the part 17 on the second pallet. The pallet change completion light 60 will then begin to flash, calling the operator back to the machine to off-load the workpiece 16 from the first pallet 14 and load a new workpiece on the pallet.

Upon completion of the machining of part 17 on the second pallet 15, the process previously described will now repeat itself to exchange the two pallets.

Although various minor modifications might be suggested by those skilled in the art, it should be understood that my wish to embody within the scope of the patent warranted hereon all such modifications as reasonably and properly come with the scope of my contribution to the art.

I claim as my invention:

1. An automatic pallet changer system for an automatic machining center, the automatic machining center having a machining enclosure with an automated machine tool therein and a bed moveable in two dimensions for carrying a workpiece which is being machined, said pallet changer system comprising:

a receiver on the bed for receiving a first pallet or a second pallet;

a first track for receiving the first pallet having a first workpiece thereon, and a second track for receiving the second pallet having a second workpiece thereon, said first and second tracks being side-by-side, said tracks extending from outside of said enclosure to inside said enclosure;

a powered linear drive unit arranged between the first and second tracks having a carriage which moves along a longitudinally extending carriage guide in a straight line, and wherein said linear drive unit has a mechanism for engaging said carriage with the first or second pallet; and a control unit connected to operate the linear drive unit;

wherein the mechanism of the linear drive unit for engaging with the first or second pallet comprises a rocker unit for rocking the linear drive unit to the left or to the right so that a member on said carriage engages the first or second pallet, and wherein said rocker unit is connected to the linear drive unit.

2. The system according to claim 1 wherein the member comprises a dog engaging in a notch of a plate on the respective first and second pallets.

3. The system according to claim 1 wherein the control unit comprises a programmable logic control.

4. The system according to claim 1 wherein the control unit controls the rocker unit for rocking the linear drive unit to the left or to the right, and for sensing when the first pallet or the second pallet is in a loading position external to the enclosure, or in an unloading position inside the enclosure.

5. The system according to claim 1 wherein the linear drive unit has a drive screw engageable with the carriage and a transmission mechanism between an end of the screw and the motor for linking the motor to the screw for forward and reverse rotation of the screw.

6. The system according to claim 1 wherein the receiver provided on the bed has a draw plate which moves up and down relative to the receiver for clamping or unclamping one of said first or second pallets to the receiver in the machining enclosure.

7. The system according to claim 1 wherein respective first and second rocker switches are provided connected as inputs to the control unit for determining when the linear drive unit is rocked left or rocked right by the rocker unit.

8. The system according to claim 1 wherein a home return switch is connected to send a signal to the control unit for determining when the carriage of the linear drive unit is at a home position outside of the machining enclosure.

9. The system according to claim 8 wherein the home position is adjacent an end of the linear drive unit where a servo motor is located.

10. The system according to claim 1 wherein pallet presence switches are connected to provide signals to the control unit for the respective first and second tracks for determining when the first pallet or second pallet is in position for loading a workpiece thereon outside the machining enclosure.

11. The system according to claim 1 wherein receiver position switches are connected to the control unit to provide signals to the control unit for determining when the receiver is adjacent the first or second track inside the machining enclosure at an end of the linear drive unit.

12. The system according to claim 1 wherein at least one switch is connected to provide a signal to the control unit for determining when a draw plate of the receiver is in at least one of a down position or an up position to control clamping or unclamping of one of said first or second pallets to the receiver.

13. The system according to claim 1 wherein a door switch is connected as an input to the control unit for determining an up position of a door at an entry opening into the machining enclosure.

14. The system according to claim 1 wherein the control unit has first and second output signals for activating a first or second pallet locking member for locking the first or second pallet in position on the respective first or second track outside the enclosure when loading or unloading the first or second pallet.

15. The system according to claim 1 wherein the control unit outputs a left signal and a right signal to a rocker unit rocking the linear drive unit to the left or to the right.

16. The system according to claim 1 wherein the control unit outputs a forward or reverse signal to a motor for driving the motor in a reverse or forward direction for moving the carriage on the linear drive unit into or out of the machining enclosure.

17. The system according to claim 1 wherein the control unit outputs an up or down signal for a door cylinder for raising or lowering a door at an entry aperture to the machining enclosure.

18. The system according to claim 1 wherein the control unit outputs a clamp or an unclamp signal to the receiver for fastening or unfastening a respective pallet relative to the receiver by raising or lowering a draw plate of the receiver.

19. The system according to claim 1 wherein an emergency stop is provided as an input to the control unit to stop all pallet movement.

20. The system according to claim 1 wherein a manual/auto switch is provided as an input to the control unit for allowing an operator to select a manual or an automatic mode.

21. The system according to claim 1 wherein a ready switch is provided as an input to the control unit, said ready switch being triggerable by an operator when one of said first or second pallets is ready for automatic movement.

22. The system according to claim 1 wherein the control unit has an output to a ready light for indicating that said automatic machining center is ready for a pallet change.

23. The system according to claim 1 wherein each pallet has an engagement member thereon with a notch therein adjacent the linear drive unit and wherein the carriage of the linear drive unit has a projection therefrom which is moved to the left or the right for being received in the respective notch of the respective engagement member connected to the first or second pallet.

24. The system according to claim 22 wherein the engagement member comprises a plate.

25. An automatic machining system, comprising:

an automatic machining center having an enclosure with an automated machine tool therein and a receiver on a bed moveable in two dimensions horizontally for carrying a pallet with a workpiece thereon which is being machined;

a first track for receiving a first pallet having a first workpiece thereon and a second track for receiving a second pallet having a second workpiece thereon, said first and second tracks being side-by-side, said tracks extending from a region outside said enclosure to a region inside said enclosure adjacent said receiver;

a linear drive unit arranged between said first and second tracks having a carriage which moves along a longitudinally extending carriage guide and wherein said carriage has a member for engaging with the first or second pallet depending upon whether the linear drive unit is rocked to the left or to the right;

a motor connected to the linear drive unit for causing a movement of the carriage along the carriage guide;

a rocker unit connected to the linear drive unit for rocking the linear carriage unit to the left or to the right; and a control unit connected to operate the linear drive unit and the rocker unit.

26. The system according to claim 1 wherein an automatic machining center control associated with the parent machining center has a first output to the control unit for indicating that the automatic machining center is ready to make a first pallet change, a second output to the control unit for determining that the automatic machining center is ready to make a second pallet change, and wherein the control unit has an output to the automatic machining center control indicating pallet change completion.

* * * * *